(12) United States Patent
Crane et al.

(10) Patent No.: US 11,333,841 B2
(45) Date of Patent: May 17, 2022

(54) FIBER TRANSITION HOUSING WITH OPTICAL CONNECTION FEATURES

(71) Applicant: Corning Research & Development Corporation, Corning, NY (US)

(72) Inventors: Robert Alexander Crane, Fort Worth, TX (US); Christian Shane Duran, Fort Worth, TX (US); John Austin Keenum, Haltom City, TX (US); Jose Manuel Hernandez Quintana, Reynosa (MX); Rodger Alan Tenholder, Saginaw, TX (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/864,663

(22) Filed: May 1, 2020

(65) Prior Publication Data
US 2020/0348478 A1 Nov. 5, 2020

Related U.S. Application Data

(60) Provisional application No. 62/841,431, filed on May 1, 2019.

(51) Int. Cl.
G02B 6/00 (2006.01)
G02B 6/44 (2006.01)

(52) U.S. Cl.
CPC ......... *G02B 6/4452* (2013.01); *G02B 6/4446* (2013.01); *G02B 6/4455* (2013.01); *G02B 6/4463* (2013.01); *G02B 6/4471* (2013.01)

(58) Field of Classification Search
CPC .. G02B 6/4452; G02B 6/4463; G02B 6/4455; G02B 6/4471; G02B 6/4446; G02B 6/4454; G02B 6/3897; G02B 6/00
See application file for complete search history.

(56) References Cited

U.S. PATENT DOCUMENTS

| | | | |
|---|---|---|---|
| 7,809,232 B2 * | 10/2010 | Reagan | G02B 6/4471 385/134 |
| 2002/0150372 A1 * | 10/2002 | Schray | G02B 6/3897 385/135 |
| 2006/0222309 A1 * | 10/2006 | Grubish | G02B 6/445 385/135 |
| 2016/0091682 A1 | 3/2016 | Wakileh et al. | |

* cited by examiner

*Primary Examiner* — Jennifer Doan
(74) *Attorney, Agent, or Firm* — Tamika A. Crawl-Bey

(57) ABSTRACT

An enclosure configured to simultaneously accommodate different connectorization applications includes a backplate and a bulkhead bracket and splice retention clips coupled to the backplate. The bulkhead bracket includes openings configured to house adapters for a first connecterized application. The splice retention clips are configured to accommodate one or more of a fusion splice protector and a mechanical splice for a second connecterized application. The bulkhead bracket, with or without an adapter, is configured to be uncoupled from the backplate to allow access to the splice retention clips for insertion or deletion of the fusion splice protector or the mechanical splice. The bulkhead bracket is configured to be recoupled with the backplate and over the splice retention clips.

17 Claims, 12 Drawing Sheets

FIBER TRANSITION HOUSING WITH OPTICAL CONNECTION FEATURES

CROSS-REFERENCE TO RELATED APPLICATIONS

This application claims the benefit of priority under 35 U.S.C. § 119 of U.S. Provisional Application Ser. No. 62/841,431 filed on May 1, 2019, the content of which is relied upon and incorporated herein by reference in its entirety.

BACKGROUND

The present disclosure generally relates to fiber transition housings, and particularly fiber transition housings having optical connection features.

Optical access networks connect subscribers of high bandwidth telecommunication services to providers of these services. A fiber to the home (FTTH) model that allows for use of optical fiber from a central point directly to individual buildings such as residences, apartment buildings and businesses to provide unprecedented high-speed Internet access is an optimal method for providing bandwidths of up to 1 gigabytes. An improved enclosure is needed to provide a connection point between the provider and the subscriber cables to allow for services over fiber that provide higher bandwidths to individual buildings.

SUMMARY

Embodiments are directed to an improved enclosure that incorporates features to accommodate one or more adapters for joining connectorized fiber cables, fusion splice protectors and mechanical splices. One or more backplates configured to route excess cable, strain-relief cables entering the enclosure, and provide a grounding point, if necessary, may be mounted in the enclosure. The enclosure may also include a bulkhead bracket that is configured to hold adapters. The bulkhead bracket may be removable to allow for access to the features that hold fusion and/or mechanical splices. The enclosure is thus configured to simultaneously accommodate both adapters for joining connectorized fiber cables and fusion and/or mechanical splices.

In an embodiment, the enclosure is configured to simultaneously accommodate different connectorization applications. The enclosure includes a backplate and a bulkhead bracket coupled to the backplate. The bulkhead bracket includes openings configured to house adapters for a first connecterized application. The enclosure further includes splice retention clips coupled to the backplate. The splice retention clips are configured to accommodate one or more fusion splice protectors and/or mechanical splices for a second connecterized application. The bulkhead bracket, with or without an adapter, is configured to be uncoupled from the backplate to allow access to the splice retention clips for insertion or deletion of one or more of the fusion splice protector and the mechanical splice. The bulkhead bracket is configured to be recoupled with the backplate and over the splice retention clips.

In another embodiment, the enclosure is configured to simultaneously accommodate different connectorization applications. The enclosure includes a base and a bulkhead bracket coupled to the base. The bulkhead bracket includes openings configured to house adapters for a first connecterized application. The enclosure further includes splice retention clips coupled to the base. The splice retention clips are configured to accommodate one or more of a fusion splice protector and a mechanical splice for a second connecterized application. The bulkhead bracket, with or without an adapter, is configured to be uncoupled from the base to allow access to the splice retention clips for insertion or deletion of one or more of the fusion splice protector and the mechanical splice. The bulkhead bracket is configured to be recoupled with the base and over the splice retention clips.

In another embodiment, the enclosure is configured to simultaneously accommodate different connectorization applications. The enclosure includes a backplate and a bulkhead bracket integrated with the backplate, wherein the bulkhead bracket includes openings configured to house adapters for a first connecterized application. The enclosure also includes splice retention clips coupled to the backplate, wherein the splice retention clips are configured to accommodate one or more of a fusion splice protector and a mechanical splice for a second connecterized application. The backplate includes slots for providing access to the splice retention clips.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
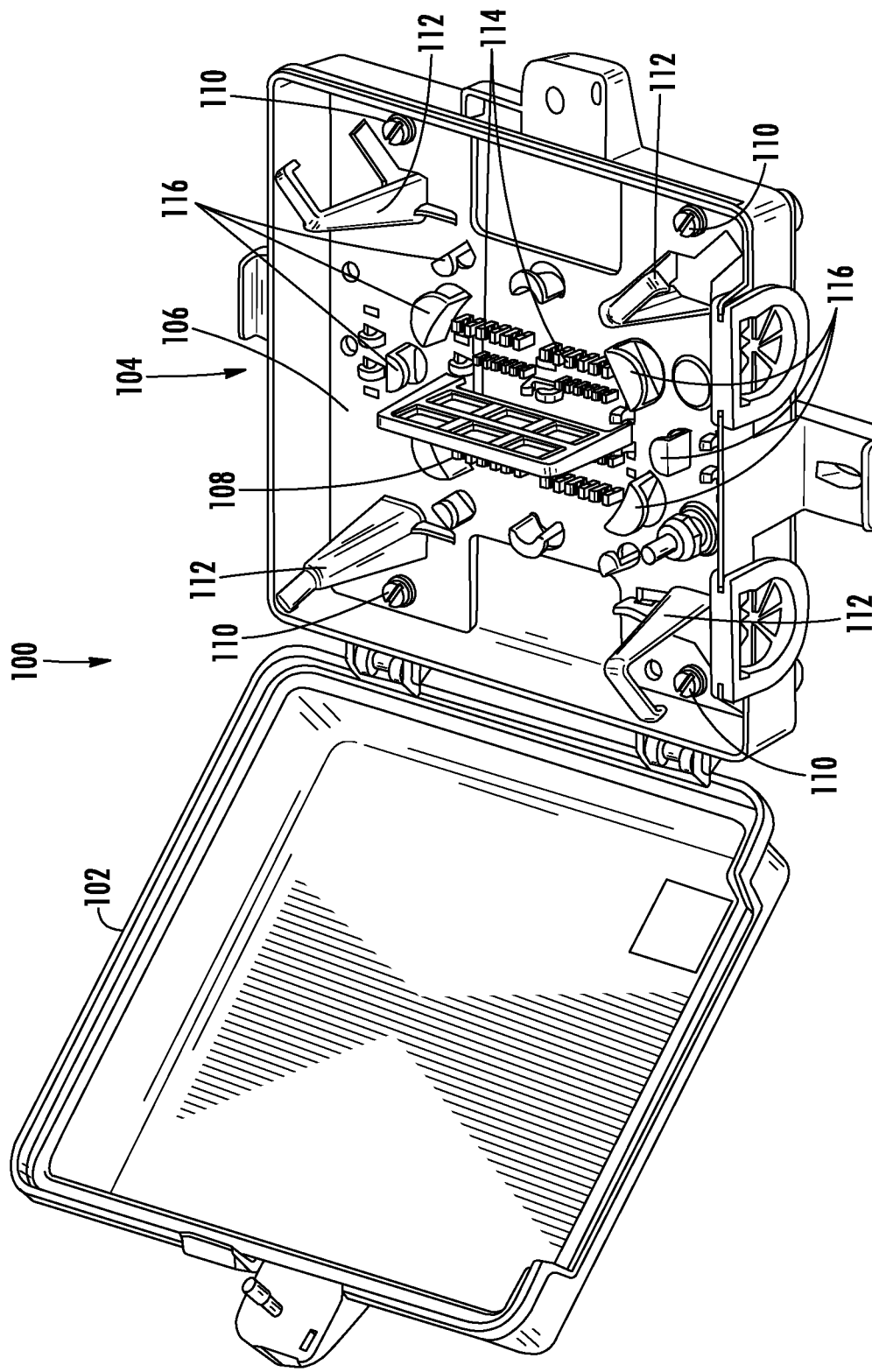
FIG. 1 shows an enclosure used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 shows an enclosure used in accordance with some embodiments. Enclosure 100 includes a cover or door 102 and a base 104, each of which may be made from metal, plastic or other materials. Base 104 may include a backplate 106 configured to route excess cable, strain-relief cables entering enclosure 100, and provide a grounding point, if necessary. Backplate 106 may be mounted on or otherwise coupled to the base 104 with mounting members 110, for example, screws.

One or more first routing members 112, a bulkhead bracket 108, splice retention clips 114 and/or second routing members 116 may also be mounted on or otherwise coupled to the backplate 106 with, for example, snaps, adhesives or screws. In some embodiments, one or more first routing members 112, bulkhead bracket 108, splice retention clips and/or second routing members may be integrated into backplate 106. First routing members 112 are configured to route excess cables in the enclosure and may be configured as, for example, the L-shaped fingers shown in FIG. 1. It would be obvious that first routing members 112 may be configured in other shapes. Second routing members 116 are configured to route fiber and fiber slack in the enclosure.

Bulkhead bracket 108 is configured with openings that are configured to house adapters for connecterized applications. Splice retention clips 114 are configured to accommodate one or more fusion splice protectors and/or mechanical splices. In FIG. 1, splice retention clips 114 are shown as fingers and are configured for each fusion splice protector or mechanical splice to snap into opposing sides of a pair of splice retention clips 114. Second routing members 116 are configured to route fiber and fiber slack in backplate 106 with the capability to manage, for example, 250 micron bend radius.

In an embodiment, bulkhead bracket 108 may be coupled to backplate 106 with a hinge point and a snap to hold bulkhead bracket 108 in place on backplate 106. The hinge point used to mount bulkhead bracket 108 is configured to accommodate uncoupling (i.e., rotation and/or removal) of bulkhead bracket 108 from backplate 106 to allow for access to splice retention clips 114. If bulkhead bracket 108 is uncoupled from its mounted position (i.e., removed and/or rotated from its mounted position on backplate 106) to access splice retention clips 114, after the splices are inserted into splice retention clips 114, bulkhead bracket 108, with or without adapters, can be recoupled to backplate 106. This enables enclosure 100 to accommodate both types of connectorization applications (i.e., adapter and splice connectorization applications) at the same time, such that bulkhead bracket 108, with or without adapters, is configured to be recoupled with backplate 106 whether or not fusion splice protector and mechanical splice are inserted into splice retention clips 114.

In embodiments where bulkhead bracket 108 is integrated into backplate 106, backplate 106 may include slots or other means for providing access to splice retention clips 114. Backplate 106 may be configured to accommodate multiple bulkhead brackets 108 (See FIGS. 12 and 13) to allow for additional adapters to be housed in enclosure 100, if required, although only one bulkhead bracket is shown in FIG. 1 for simplicity.

In an embodiment, a pigtail may be spliced to incoming fibers and the splice protectors placed in splice retention clips 114 on the backplate 106. The pigtail can then be routed in enclosure 100 and joined to an adapter located in bulkhead bracket 108.

Figure 2:
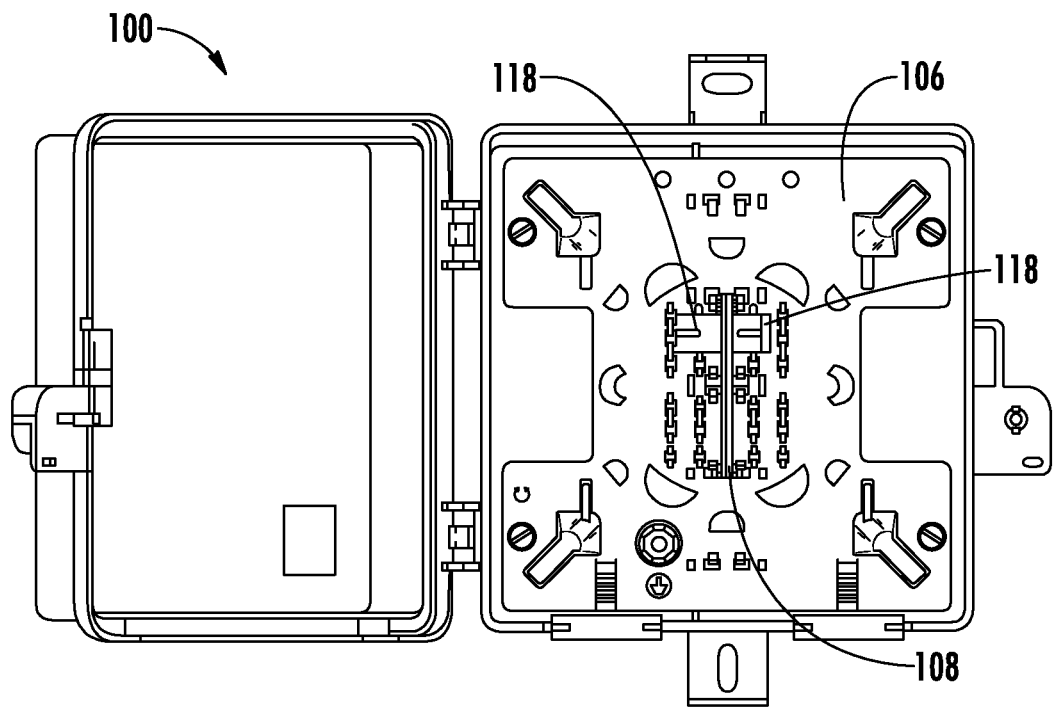
FIG. 2 shows a front view of the enclosure with a backplate and a bulkhead bracket in accordance with some embodiments.
Figure 3:
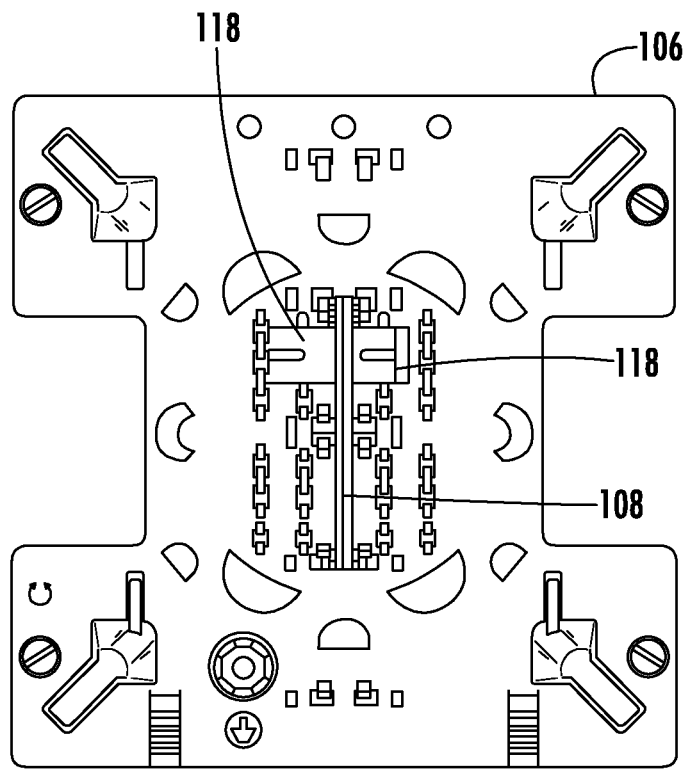
FIG. 3 shows a front view of the backplate with the bulkhead bracket including an adapter in accordance with some embodiments.

FIG. 2 shows a front view of the enclosure 100 with a backplate and a bulkhead bracket in accordance with some embodiments. Openings in bulkhead bracket 108, in FIG. 2, includes adapters 118 for connecterized applications. FIG. 3 shows a front view of backplate 106 with bulkhead bracket 108 including adapters 118 in accordance with some embodiments.

Figure 4A:
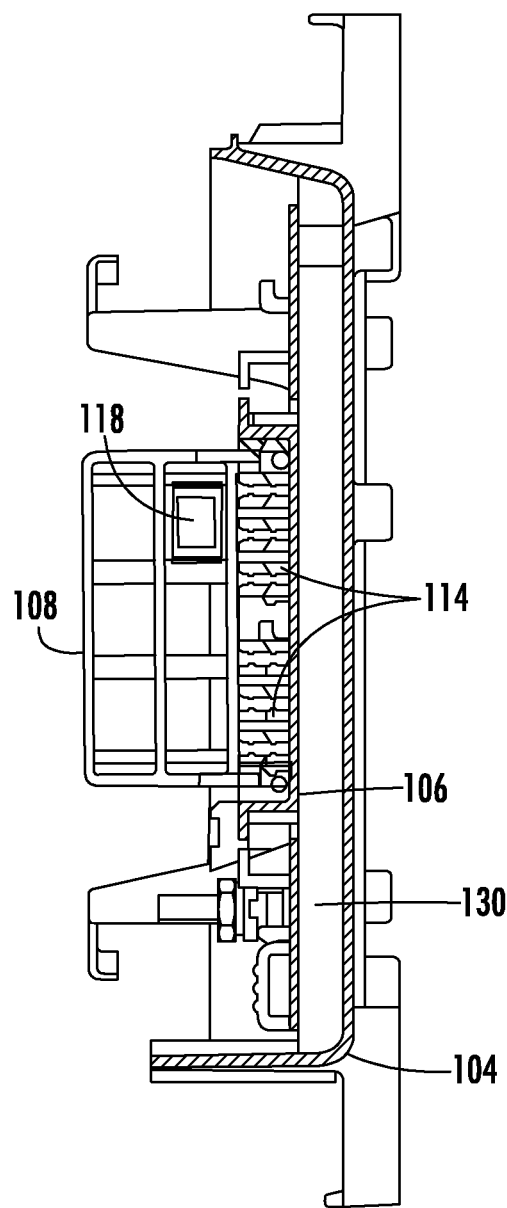
FIGS. 4A and 4B show sectional views of the backplate with the bulkhead bracket and the adapter in the enclosure in accordance with some embodiments.
Figure 4B:
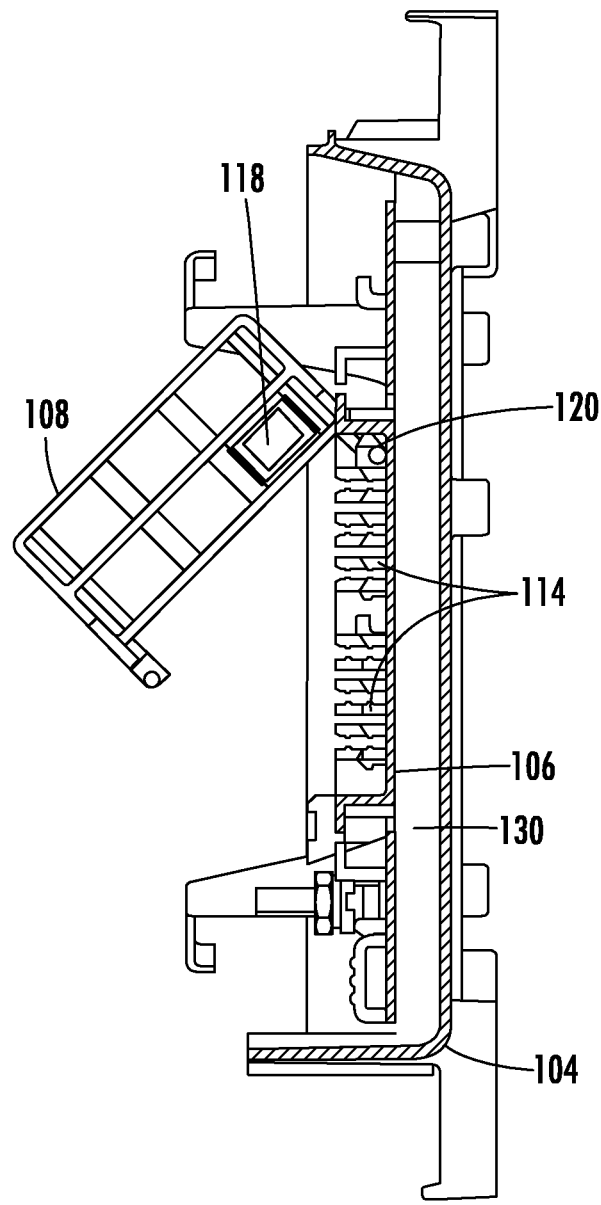

FIGS. 4A and 4B show sectional views of backplate 106 with bulkhead bracket 108 including adapters 118 in accordance with some embodiments. Backplate 106 may be flush or mounted on a platform 130 in enclosure 100. In 4A, bulkhead bracket 108, including adapter 118, is seated in or snapped into backplate 106, and in 4B, bulkhead bracket 108, including adapter 118, is rotated to allow for access to splice retention clips 114 that are configured to hold fusion and/or mechanical splices. By providing a hinge point 120 that is configured to enable rotation or removal of bulkhead bracket 108, the enclosure 100 is configured to allow for access to both adapter 118 and fusion and/or mechanical splices clipped or snapped into splice retention clips 114.

Figure 5A:
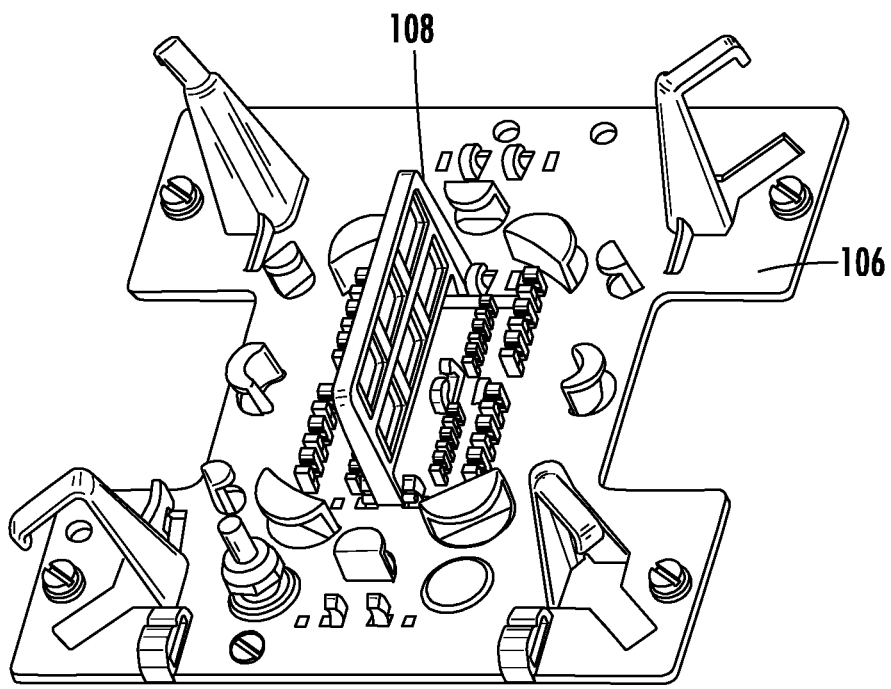
FIGS. 5A and 5B show views of the backplate with the bulkhead bracket in accordance with some embodiments.
Figure 5B:
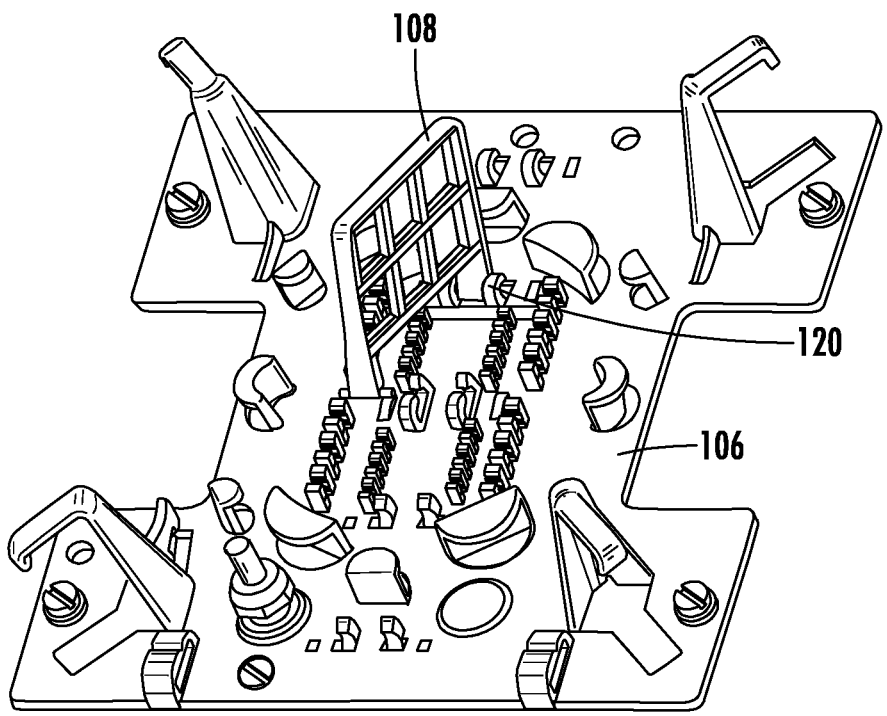

FIGS. 5A and 5B show views of the backplate 106 with bulkhead bracket 108 in accordance with some embodiments. In 5A, bulkhead bracket 108 is installed and seated in backplate 106. In 5B, one end of bulkhead bracket 108 is lifted from the backplate 106 and bulkhead bracket 108 is rotated, showing hinge point 120

Figures 6A, 6B:
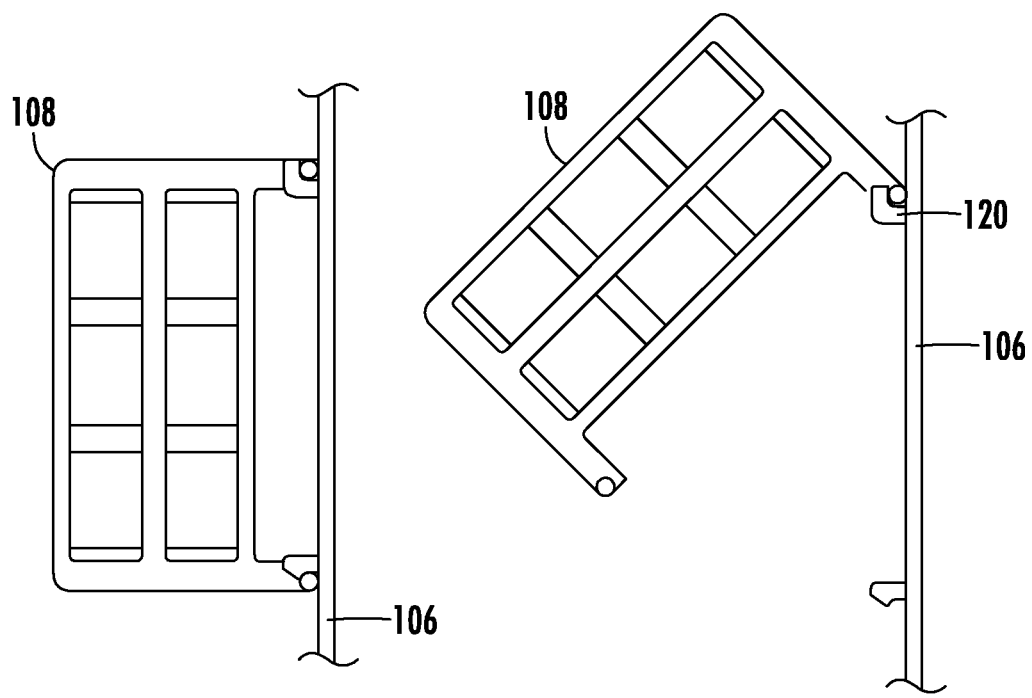
FIGS. 6A and 6B shows sectional views of the backplate and the bulkhead bracket in accordance with some embodiments.

FIGS. 6A and 6B show sectional views of the backplate 106 and bulkhead bracket 108 assembly in accordance with some embodiments. FIG. 6A shows bulkhead bracket in a seated position and installed in backplate 106 and FIG. 6B shows bulkhead bracket 108 rotated on hinge-point 120.

Figure 7A:
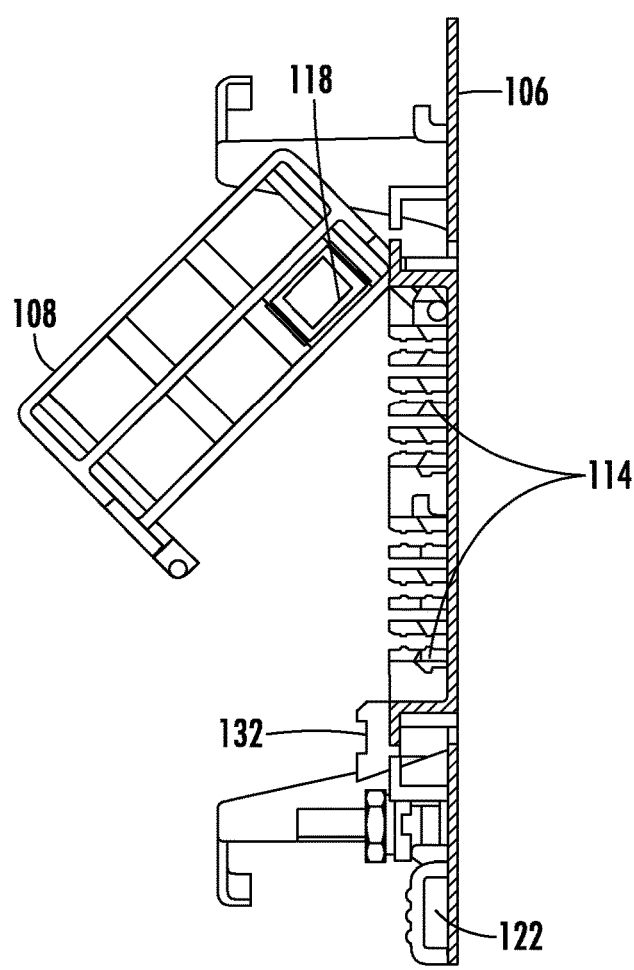
FIGS. 7A and 7B show other sectional views of the backplate and the bulkhead bracket assembly in accordance with some embodiments.
Figure 7B:
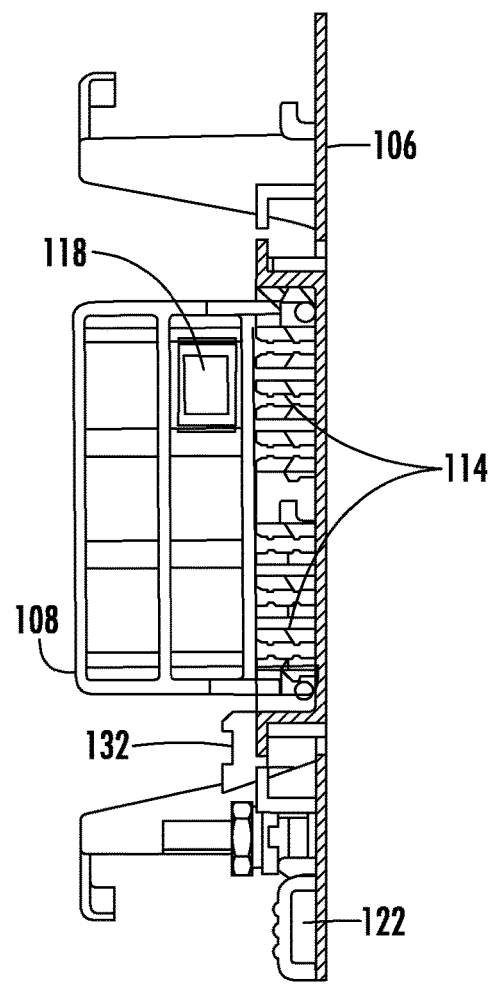

FIGS. 7A and 7B show other sectional views of the backplate 106 and bulkhead bracket 108 assembly in accordance with some embodiments. In FIG. 7A, bulkhead bracket 108 includes an adapter 118 and one end of bulkhead bracket 108 is lifted from the backplate 106 to make bulkhead bracket 108 rotatable on backplate 106. In FIG. 7B, both ends of bulkhead bracket 108 are seated on backplate 106. Backplate 106 includes a strain-relief member 122 configured for strain relief of incoming cables entering enclosure 100. The strain-relief member 122 includes a loop with gripping teeth which bites into the cable when cinched with a tie-wrap or other cinching method. The strain-relief member 122 provides a t-shaped feature 132 configured as a second point to tie down and immobilize the cable to give the cable more robust pulling power.

Figure 8A:
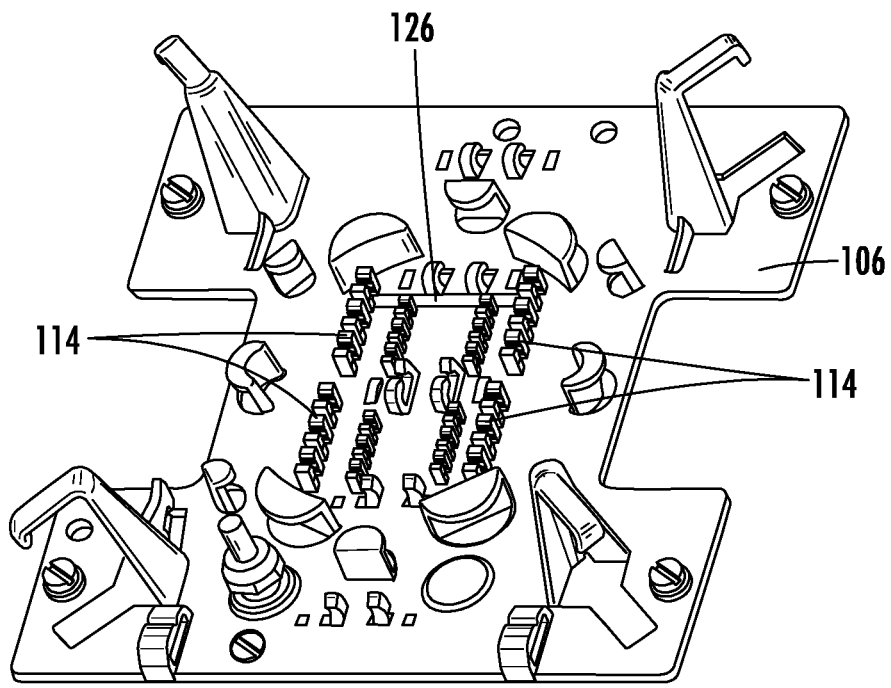
FIGS. 8A and 8B show views of the backplate with a fusion splice protector and a mechanical splice in accordance with some embodiments.
Figure 8B:
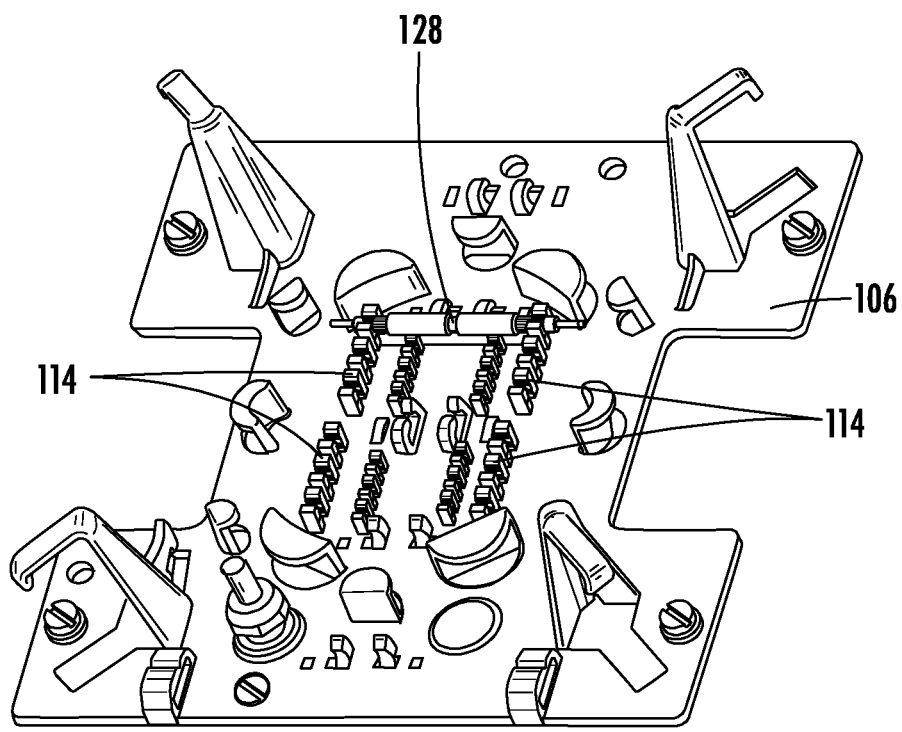

FIGS. 8A and 8B show views of the backplate 106 with a fusion splice protector 126 and a mechanical splice 128 in accordance with some embodiments. In FIG. 8A, backplate 106 includes a fusion splice protector 126 in splice retention clips 114. Although only one fusion splice protector 126 is shown, based on the configuration shown in 8A, up to six fusion splice protectors may be placed in splice retention clips 114. In 8B, backplate 106 includes a mechanical splice 128 in splice retention clips 114. Although only one mechanical splice 128 is shown, based on the configuration shown in 8b, up to six mechanical splices may be placed in splice retention clips 114. It should be obvious that enclosure 100 may be configured to hold more or less than six fusion protectors and mechanical splices.

Figure 9A:
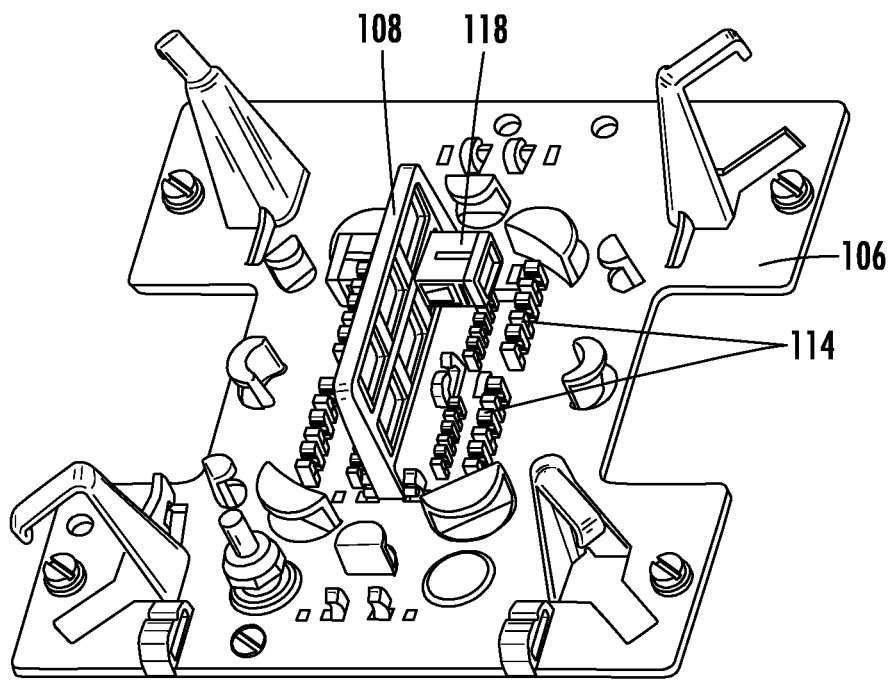
FIGS. 9A and 9B show views of the backplate with an adapter installed over a fusion splice protector in accordance with some embodiments.
Figure 9B:
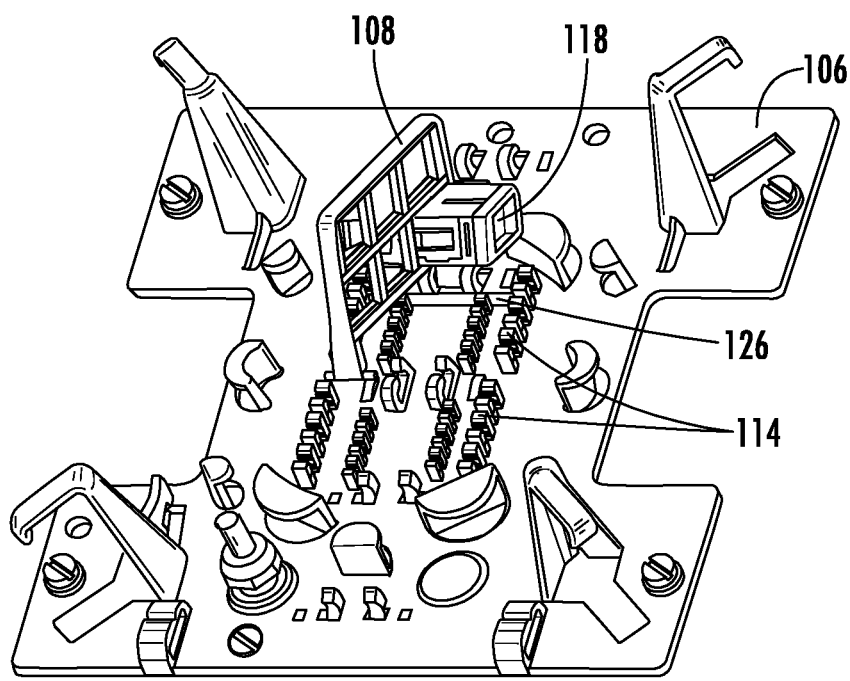

FIGS. 9A and 9B show the backplate with an adapter installed over a fusion splice protector in accordance with some embodiments. FIG. 9A shows bulkhead bracket 108 with an adapter 118 and mounted in backplate 106. In FIG. 9B, one end of bulkhead bracket 108 is lifted from the backplate 106 and rotated to show splice protector 126 in splice retention clips 114. Accordingly, FIG. 9B is intended to show that backplate 106 is configured to house one or more fusion and mechanical splices and one or more adapters in bulkhead bracket 108 simultaneously.

Figure 10:
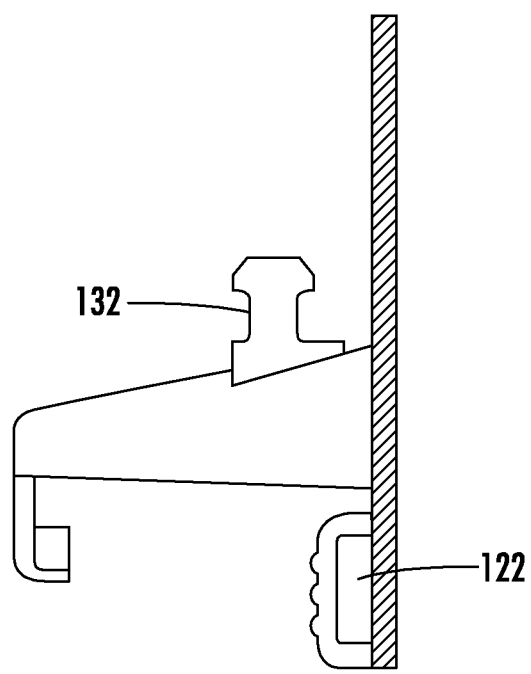
FIG. 10 shows a sectional view of a strain-relief member in accordance with some embodiments.

FIG. 10 shows a sectional view of a strain-relief member in accordance with some embodiments. Strain-relief member 122 comprises a loop with gripping teeth which bites into the cable when cinched with a tie-wrap or other cinching method and a t-shaped feature 132 configured as a second point to tie down and immobilize the cable to give the cable more robust pulling power.

Figure 11:
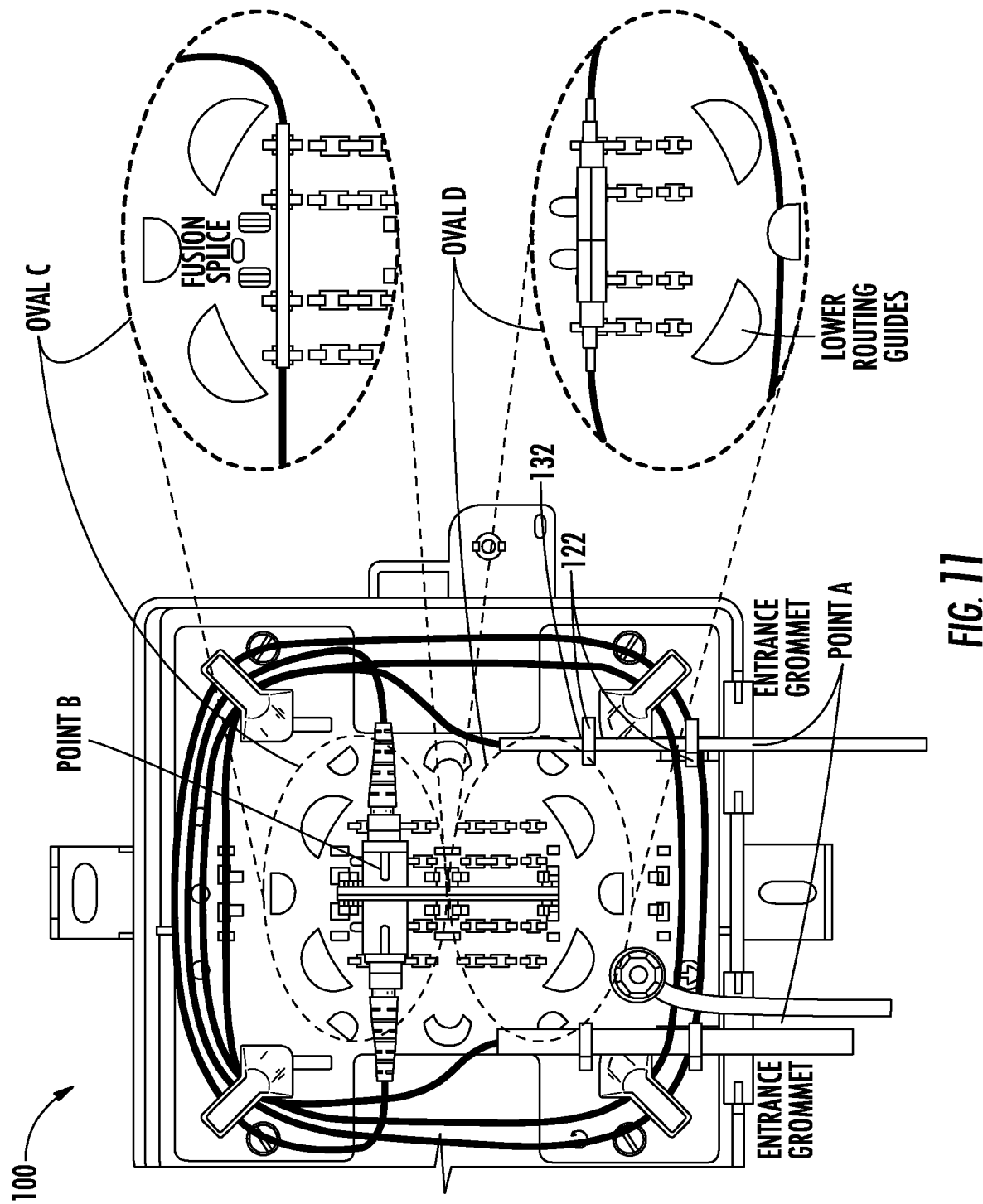
FIG. 11 shows a cable-routing diagram for using adapter and splicing methods in accordance with some embodiments.

FIG. 11 shows a cable-routing diagram for using adapter and splicing methods in accordance with some embodiments. In FIG. 11, cables may be inserted into enclosure 100 at both entrances labeled point A and the cables are tie-wrapped at strain-relief member 122 which comprises a loop with gripping teeth for biting into the cable when cinched with a tie-wrap or other cinching method. The t-shaped feature 132 of strain-relief member 122 is configured as a second point to tie down and immobilize the cable.

An adapter connector application is shown at point B. Oval C shows the location of a fusion splice, and oval D shows the location of a mechanical splice. Each of point B and ovals C, and D is provided to show how the adapter connector, fusion splice protector and mechanical splice may be simultaneously or alternately housed in enclosure 100, such that the enclosure is configured to simultaneously or alternately accommodate different connectorization applications.

In one embodiment, base 104 may include all of the features and functions of the backplate 106, thus eliminating the backplate from the enclosure configuration.

Figure 12:
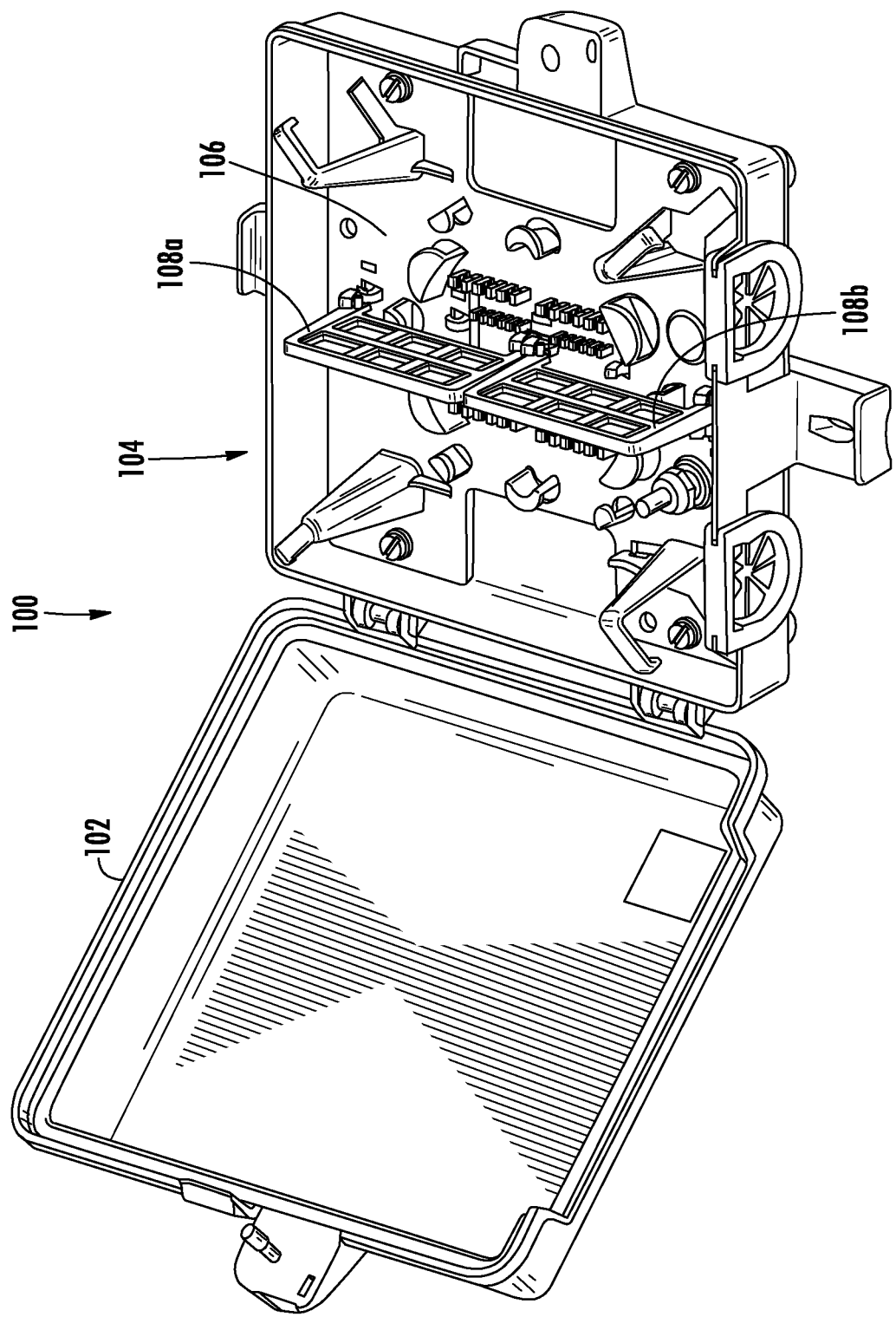
FIG. 12 shows the enclosure with multiple bulkhead brackets in one backplate in accordance with some embodiments.

FIG. 12 shows the enclosure 100 with multiple bulkhead brackets in one backplate in accordance with some embodiments. Backplate 106 in base 104 of enclosure 100 includes two bulkhead brackets 108a and 108b, each of which is configured with openings that are configured to house adapters for connectorized applications.

Figure 13:
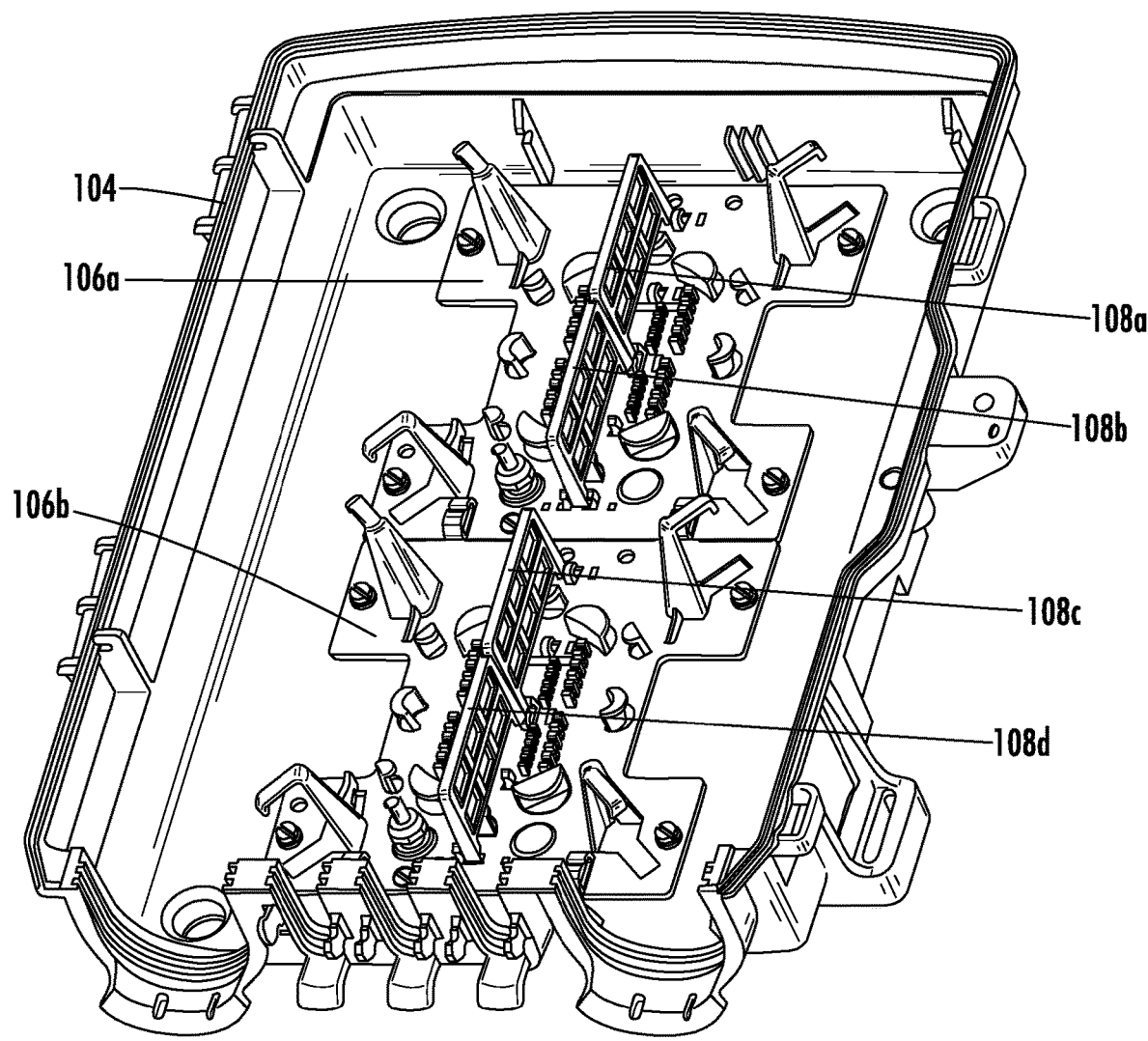
FIG. 13 shows the enclosure with multiple bulkhead brackets in two backplates in accordance with some embodiments.

FIG. 13 shows an enclosure with multiple backplates in accordance with some embodiments. Backplates 106a and 106b in base 104 includes four bulkhead brackets 108a-108d, each of which is configured with openings that are configured to house adapters for connectorized applications.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover, in this document, relational terms such as first and second, top and bottom, front and back, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An enclosure configured to simultaneously accommodate different connectorization applications, comprising:
   a backplate;
   a bulkhead bracket coupled to the backplate, wherein the bulkhead bracket includes openings configured to house adapters for a first connectorized application; and
   splice retention clips coupled to the backplate, wherein the splice retention clips are configured to accommodate one or more of a fusion splice protector and a mechanical splice for a second connectorized application; and wherein the bulkhead bracket, with or without an adapter, is configured to be uncoupled from the backplate to allow access to the splice retention clips for insertion or deletion of one or more of the fusion splice protector and the mechanical splice, and wherein the bulkhead bracket is configured to be recoupled with the backplate and over the splice retention clips.

2. The enclosure of claim 1, further comprising a base and a cover, wherein the backplate is coupled to the base.

3. The enclosure of claim 1, further comprising first routing members and second routing members, wherein the first routing members are configured to route cable in the enclosure and the second routing members are configured to route fiber and fiber slack in the enclosure, and wherein each first routing member and each second routing member is coupled to the backplate.

4. The enclosure of claim 3, wherein the second routing members are configured to route fiber and fiber slack in the backplate and manage a 250 micron bend radius.

5. The enclosure of claim 1, wherein the splice retention clips are configured such that each of the fusion splice protector and the mechanical splice is configured to snap into opposing sides on a pair of the splice retention clips.

6. The enclosure of claim 1, wherein the bulkhead bracket is coupled to the backplate with a hinge point and a snap to hold the bulkhead bracket in place on the backplate, wherein the hinge point is configured to accommodate rotation or removal of the bulkhead bracket to allow access to the splice retention clips.

7. The enclosure of claim 1, wherein a pigtail is spliced to incoming fibers, a splice is placed in the splice retention clips and the pigtail is routed in the enclosure and joined to the adapter located in the bulkhead bracket.

8. The enclosure of claim 1, wherein the backplate includes a strain-relief member configured to strain relieve incoming cables entering the enclosure, wherein the strain-relief member comprises a loop with gripping teeth which bites into a cable when cinched and a t-shaped feature configured as a second point to tie down and immobilize the cable.

9. The enclosure of claim 1, wherein the backplate is flush or mounted on a platform in the enclosure.

10. An enclosure configured to simultaneously accommodate different connectorization applications, comprising:
   a base;
   a bulkhead bracket coupled to the base, wherein the bulkhead bracket includes openings configured to house adapters for a first connecterized application; and
   splice retention clips coupled to the base, wherein the splice retention clips are configured to accommodate one or more of a fusion splice protector and a mechanical splice for a second connecterized application; and wherein the bulkhead bracket, with or without an adapter, is configured to be uncoupled from the base to allow access to the splice retention clips for insertion or deletion of one or more of the fusion splice protector and the mechanical splice, wherein the bulkhead bracket is configured to be recoupled with the base and over the splice retention clips.

11. The enclosure of claim 10, further comprising first routing members and second routing members, wherein the first routing members are configured to route cable in the enclosure and the second routing members are configured to route fiber and fiber slack in the enclosure, and wherein each first routing member and each second routing member is coupled to the base.

12. The enclosure of claim 11, wherein the second routing members are configured to route fiber and fiber slack in the base and manage a 250 micron bend radius.

13. The enclosure of claim 10, wherein the splice retention clips are configured such that each fusion splice protector and each mechanical splice are configured to snap into opposing sides on a pair of the splice retention clips.

14. The enclosure of claim 10, wherein the bulkhead bracket is coupled to the base with a hinge point and a snap to hold the bulkhead bracket in place on the base, wherein the hinge point is configured to accommodate rotation or removal of the bulkhead bracket to allow access to the splice retention clips.

15. The enclosure of claim 10, wherein a pigtail is spliced to incoming fibers, a splice is placed in the splice retention clips and the pigtail is routed in the enclosure and joined to the adapter located in the bulkhead bracket.

16. The enclosure of claim 10, wherein the base includes a strain-relief member configured for strain relieve incoming cables entering the enclosure, wherein the strain-relief member comprises a loop with gripping teeth which bites into cable when cinched and a t-shaped feature configured as a second point to tie down and immobilize the cable.

17. An enclosure configured to simultaneously accommodate different connectorization applications, comprising:
   a backplate;
   a bulkhead bracket integrated with the backplate, wherein the bulkhead bracket includes openings configured to house adapters for a first connecterized application; and
   splice retention clips coupled to the backplate, wherein the splice retention clips are configured to accommodate one or more of a fusion splice protector and a mechanical splice for a second connecterized application; and
   wherein the backplate includes slots for providing access to the splice retention clips.

* * * * *